Figure 1:
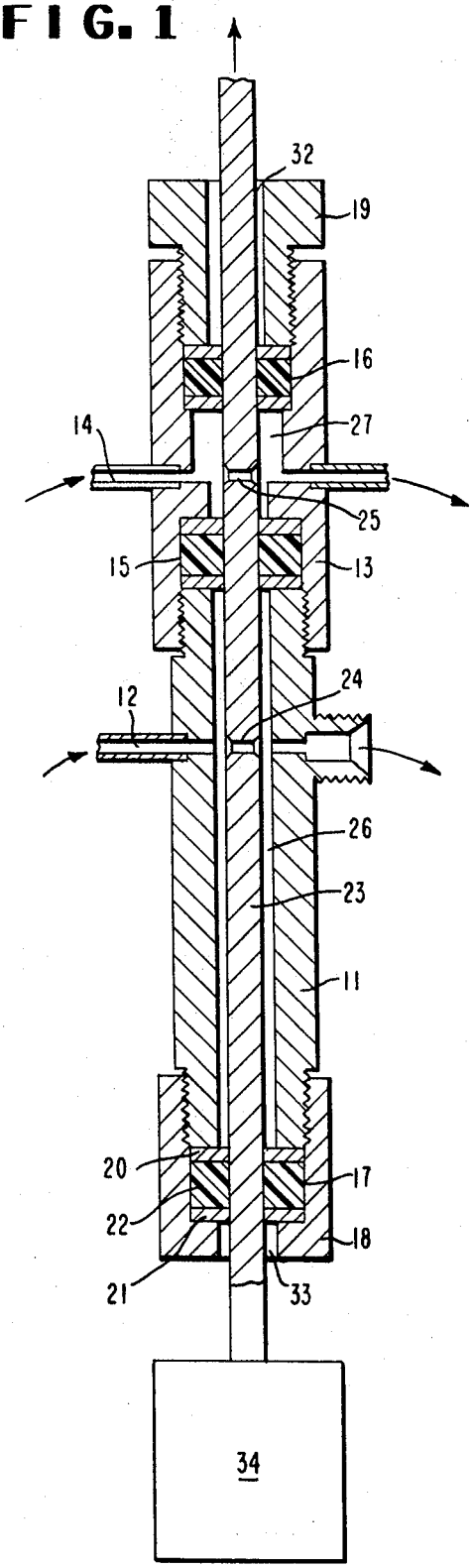

United States Patent

[11] 3,583,231

[72] Inventor Herman R. Felton
 Wilmington, Del.
[21] Appl. No. 790,240
[22] Filed Jan. 10, 1969
[45] Patented June 8, 1971
[73] Assignee E. I. DuPont de Nemours and Company
 Wilmington, Del.

[54] HIGH-PRESURE SAMPLING VALVE
 6 Claims, 2 Drawing Figs.
[52] U.S. Cl. .................................................. 73/422
[51] Int. Cl. .................................................. G01n 1/22
[50] Field of Search .................................... 73/422,
 23.1; 222/453

[56] References Cited
 UNITED STATES PATENTS
 3,100,984 8/1963 Martin .......................... 73/422
 3,160,015 12/1964 Charlton et al. ............... 73/422
 3,162,050 12/1964 MacDonald et al. .......... 73/422
 3,205,711 9/1965 Harris ........................... 73/422
 3,362,228 1/1968 Stuben .......................... 73/422

Primary Examiner—S. Clement Swisher
Assistant Examiner—Daniel M. Yasich
Attorney—Herbert M. Wolfson ABSTRACT: A high-pressure sampling valve for use in transferring a precise volume of sample fluid into a carrier stream of fluid without interrupting the flow of either stream and includes a housing and a rod movably mounted in a circular channel passing through the housing. Three seals forming leaktight seals between the rod and the housing are provided, one located at each end of the housing and one located between the two fluid channels. The rod has at least two passages passing through it, aligned with two fluid channels in the housing, and a diameter such as to provide clearance between the rod and the housing in the region of the fluid channels so that fluid will leak around the rod and dead heading the valve will be avoided. An actuator is provided to move the rod so that the passage in the rod aligned with one of the fluid channels can be aligned with the other fluid channel. By moving the rod, the volume of fluid contained in that passage of the rod aligned with the first fluid channel can be transferred to the stream of fluid passing through the second fluid channel.

PATENTED JUN 8 1971 3,583,231

INVENTOR
HERMAN R. FELTON

BY *Herbert M Wolfson*
ATTORNEY

HIGH-PRESSURE SAMPLING VALVE

BACKGROUND OF INVENTION

There are many applications, in which it is necessary to transfer a small, precise volume of fluid from one fluid stream to another. Chromatography is an example of such an application. In both liquid and gas chromatography, a small volume of sample fluid is introduced into a stream of carrier fluid, which is used to flush the sample fluid through the chromatographic column. This transfer can be accomplished manually, but it is more convenient to design a valve, through which the two fluid streams flow, which is capable of automatically transferring the desired amount of sample to the carrier stream.

A number of valves have been designed for this purpose, all of which function well at low pressure. The current trend in liquid chromatography, however, is towards high-pressure carrier fluid streams so that the sample fluid can be flushed through the chromatographic column in a shorter time. At present, liquid chromatography is normally conducted at a maximum carrier pressure of 800 to 1000 p.s.i. The present valves, built to operate in this pressure range, generally consist of: a carrier channel, through which carrier fluid flows; a sample channel incorporating a sample chamber, through which sample fluid flows; and a means for transferring the fluid in the sample chamber to the carrier stream. Aside from these standard components they vary widely in design. Some consist of a pair of flat plates moving linearly relative to one another or rotating to align the sample chamber with the carrier stream. Others consist of rods moving linearly or rotating within a housing to accomplish the same result. In some the sample chamber is external to the valve, in others it is incorporated into the valve. All are characterized by the fact that they are low-pressure valves which, if used in conjunction with a high-pressure carrier stream, will allow leakage between the carrier stream and the sample stream.

What is needed is a valve in which there is a positive high-pressure seal between the carrier channel and the sample channel. In the flat surface valves, it is difficult, if not impossible to design a moving seal which will withstand high pressure, i.e. 2,000 p.s.i., without leaking. For the rod-type valve, high-pressure seals are available, but there are two problems in the design of such a seal. First the seals around a rod are designed for rotary motion of the rod. If this type of rod motion is used to transfer sample fluid from the sample chamber to the carrier stream, then an effective high-pressure seal between the two channels is impossible, even though the ends of the valve can be effectively sealed. Second, even if a seal could be devised such a seal would wear with time so that it would have to be replaced periodically. Normal wear on such a seal might be tolerable, but in valves which are designed to transfer fluid from one stream to another, there is an inherent interruption of the flow in both channels. At high pressures, this interruption, or deadheading of the valve as it is called, will normally be destructive to the valve, or at the very least will wear the seals abnormally fast so that repair will be necessary within an extremely short period of time. For this reason, if a high-pressure carrier fluid is to be used the normal procedure is to use a single valve to control the carrier fluid, or to shut off the carrier stream before the sample fluid is injected manually into the carrier stream by a hypodermic needle or some suitable device.

SUMMARY OF INVENTION

The present invention is a high-pressure sample valve for use in transferring a precise volume of sample fluid into a carrier stream of fluid. The present invention employs high-pressure seals around a rod but provides for linear motion of the rod relative to the seals and housing which hold the rod, rather than rotary motion. The valve consists of a housing and a rod, movably mounted in a circular channel passing through the housing. Two fluid channels, separated from one another by a short distance, are provided; each passing through the housing perpendicular to, and through the axis of, the circular channel containing the rod. The rod has at least two passages passing through it aligned with the fluid channels; and an actuator is provided to move the rod so that the passage in the rod aligned with one of the fluid channels can be moved into alignment with the other fluid channel. By moving the rod, the volume of fluid contained within the passage of the rod aligned with the first fluid channel can be transferred to the stream of fluid passing through the second fluid channel.

In this respect the valve described above is similar to the valve described in U.S. Pat. No. 2,846,121 issued on Aug. 5,1958 to H. R. Ronnebeck; but here the similarity ends. The present inventor provides for three leaktight seals between the rod and the housing; one located at each end of the housing and one located between the fluid channels. This provides a positive seal between the carrier and sample channels. Having provided such a seal, some method must be included to prevent deadheading of the fluid streams, especially the carrier stream, as the valve rod is moved. This is done by providing clearance between the rod and the housing in the region of the fluid channels so that fluid will leak around the rod. The amount of clearance can be different in the region of the sample channel than in the region of the carrier channel, because in the former region the flow need not be interrupted at all while in the latter region the flow must at least be reduced while the rod is moving, for reasons that will appear in the discussion below. By providing this calculated clearance, and by making the housing so that the seals can be adjusted periodically, wear on the seals can be kept to a minimum and corrected without continuously disassembling the valve. The Ronnebeck valve does not contemplate high-pressure sealing and by its very design cannot tolerate clearance between the shaft and housing so that even if seals were provided, the destructive effect of interrupting the fluid flow which is inherent in the design of the valve would render such sealing ineffective after a short period of time.

Figure 2:
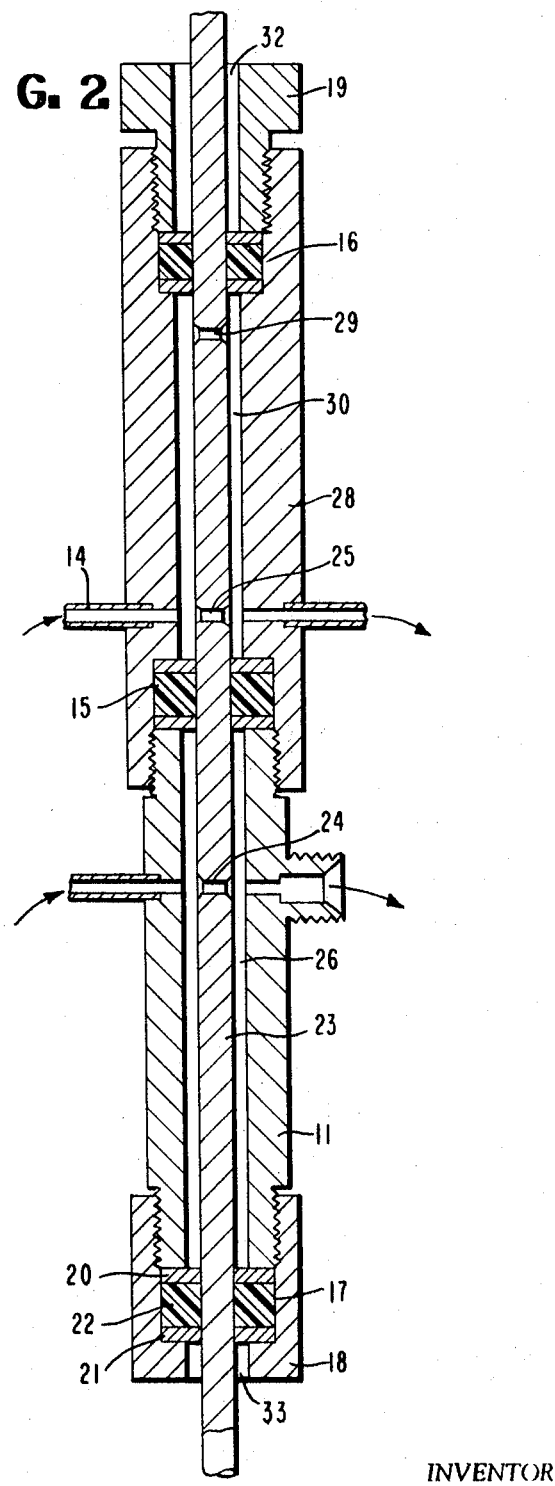

The advantages and operation of the present invention can best be seen with reference to:

FIG. 1, which is a sectional view of one possible embodiment of a high-pressure sampling valve; and FIG. 2, which is a sectional view of a second possible embodiment of a high-pressure sampling valve.

DISCUSSION OF DRAWINGS

In FIG. 1, the housing of the valve is illustrated as being divided into four sections; the first housing section 11, the second housing section 13 and two end caps 18 and 19. The first housing section is a block of material, which may be in the form of a cylinder, which has a cylindrical channel 26 and a fluid channel 12 cut through it. Fluid channel 12 is substantially cylindrical, has a diameter less than the diameter of channel 26, and is aligned so that it passes directly through the axis of channel 26 in a direction perpendicular to that axis. This fluid channel will be designated, herein, as either the second channel, or the carrier channel, as would be the case if the valve were to be used in a chromatograph. The fluid entering channel 12 will be referred to as the carrier fluid. It enters channel 12 on one side, as indicated by the arrow, at high pressure, and exits into the chromatographic column on the other side, as indicated. In the drawing a Swagelok®type connector is indicated for the connector between the valve and column. Normally, the distance between the column and the valve should be kept to a minimum so that the dead volume between them is minimized. The connection illustrated facilitates direct connection between the column and the valve in the shortest possible distance and as such is preferred for some uses; but its use is optional.

The second housing section is also made from a block of material, which can be in the form of a cylinder, and also has a cylindrical channel 27 and fluid channel 14 passing through it. Channel 14 is aligned perpendicular to and passes through the axis of channel 27. Channel 14 will be designated, herein, as either the third channel, or the sample channel, as would be the case if the valve were to be used in a chromatograph. The fluid entering channel 14 will be referred to as the sample fluid. It enters channel 14 on one side, as indicated by the arrow, and exits on the other side as indicated. The direction of flow can be reversed if the circumstances require. The sample fluid exits from channel 14 into a receptacle or a drain, not shown.

End plugs 18 and 19 are also made from blocks of material and can be cylindrical in shape as illustrated. They have substantially circular channels 32 and 33 passing through them and are designed to mate with the other housing parts. They can be in the form of discs attached to the other housing parts by screws, but the design illustrated allows continual tightening of the seal between these parts and is to be preferred, for reasons to be noted below.

All four housing sections are aligned so that there is a continuous channel of substantially circular cross section passing through them. This entire channel, composed of channel 26, 27, 32 and 33 will be referred to herein as the first channel. A rod is disposed within this first channel. Housing parts 11 and 13 mate together with a seal 15 between them. End plug 18 mates with the exposed end of housing section 11, seating seal 17; and end plug 19 mates with the exposed end of housing section 13 seating seal 16. These seals are designed to form a leaktight seal between the rod and the housing. They are rotary-type seals, generally designed to allow rotation of rod 23 within the housing. If enough force is provided, however, the rod can be moved along the axis of the first channel and the seal will remain leaktight. Seals 16 and 17 are positioned at the ends of the housing to prevent fluid from leaking out of the valve. Seal 15 is located between the second and third channels forming a positive seal between them.

Seals 15, 16 and 17 are illustrated as being composed of three parts. Two metal discs 20 and 21 with holes through their centers, and an elastomeric disc with a hole through its center. The elastomeric disc can be made from any suitable material known to those skilled in the art, but it is preferable if the material is a nonstick material such as Teflon®fluorocarbon. The holes through the metal discs are large enough so that the rod can pass through them. The hole through the elastomeric disc can be slightly larger than or slightly less than the diameter of the rod, so long as the rod can be passed through it. The elastomeric disc is positioned between the two metal discs and the rod is passed through all of them. When the metal discs are pressed together, the elastomeric disc is squeezed down on the rod forming the leaktight seal.

To facilitate forming the seals, the housing has been divided into four sections designed to threadedly engage one another. It is conceivable that the housing could be a single piece with the seals inserted into recesses cut into the housing, but this type of housing would be difficult to machine and would have a distinct disadvantage over the present design. All seals have a tendency to wear, and after a time leak because of that wear. With the design illustrated, if wear and leakage occurs, the seals can be further tightened by twisting the housings and end plugs until the elastomeric seals squeeze down more tightly on the rod. In this way the life time of the valve, i.e. the time that it can be used without taking it apart and replacing the seals, is increased.

The second (carrier) and third (sample) channels in the housing are illustrated as being substantially circular. This is not necessary. They can have any cross section. All that is necessary is that the cross section of each of these channels be such that the whole channel passes through the first channel. No portion of the second and third channel should pass through the housing without passing entirely through the first channel.

The rod, as illustrated in FIG. 1, has two passages 24 and 25 passing from one side of it to the other. As illustrated, these passages are holes through the rod, but grooves in the rod or any such passage from one side to the other would suffice. The holes are aligned so that when the rod is in its normal position, as shown, there is a separate hole aligned with each of the second and third channels. These passages can be of any cross section. The important thing is that the passage normally aligned with the third channel has a volume precisely equal to the volume of sample that is to be transferred to the carrier stream.

In operation, an actuator, 34 in FIG. 1, is provided which will move the rod along the axis of the first channel. It is designed to move the rod a distance equal to the separation between the two passages in the rod. Normally, the rod is in the position indicated, and fluid flows through both the carrier and sample channels. When activated, the actuator moves the rod so that the hole 25, aligned with the third (sample) channel 14, is moved into alignment with the second (carrier) channel 12, and hole 24 is moved out of position. The only sample fluid allowed to pass between the second and third channels through seal 15 is that contained in passage 25. When the fluid contained in this passage reaches the second channel, it is incorporated into the carrier stream. The actuator then returns the rod to its normal position.

As illustrated in FIG. 1, there is a clearance between the rod and the housing. This clearance is different in the region of the carrier channel than it is in the region of the sample channel. The clearance between the rod and the housing in the region of the carrier channel is chosen so that there will always be some leakage of carrier fluid around the rod and through the carrier channel. If this were not so, when passage 24 is moved out of alignment with the channel and before passage 25 moved into alignment with it, the carrier channel would be deadheaded. Under the high pressure present in the carrier stream this is not good practice, for reasons well known to those skilled in the art. Providing clearance between the rod and the housing at least provides a leakage path which is helpful in avoiding the destructive effect of completely deadheading the channel. The amount of clearance provided is chosen so that when a passage through the rod is aligned with the channel the resistance to flow through that passage is less than the resistance to flow around the rod. With this condition met, the fluid flowing through the channel will always follow the passage through the rod rather than around it when the passage is aligned with the channel. This is necessary if the sample fluid is to be injected into the carrier stream in a compact volume. If the clearance around the rod in the vicinity of the carrier channel is too large, then presenting passage 25 to the carrier channel would not present a reduced resistance path for the carrier stream to follow; this is desired in order for the carrier fluid to push the sample fluid contained in that passage before it into the column. Instead, fluid would flow around and through the rod, indiscrimately, and the sample would drift into the column over a longer period of time than desirable. Even though deadheading the channel should be avoided, then, some substantial increase in the resistance to fluid flow in the channel must be tolerated, when the passage through the rod is not aligned with the channel, to insure a sharp, compact, injection of sample fluid into the column.

The need for an increase in the resistance to fluid flow when no passage through the rod is aligned with the channel is not present for the sample channel. The sample channel does not exit into a column, but merely into a drain or receptacle. Therefore the sample channel can be designed so that there is no substantial variation in the flow of fluid when the rod is moved. This can be accomplished in a number of ways. One convenient way to do this is illustrated in FIG. 1 where the clearance between the rod and housing in the area of the sample channel is larger than the clearance in the area of the carrier channel. This provides a path of substantially the same resistance to fluid flow whether the passage 25 is in line with the sample channel or not. Another way to accomplish the same result is illustrated in FIG. 2 where the rod has three passages through it instead of two. The third passage 29 is positioned so that when the passage 25 is moved into alignment with the carrier channel, passage 29 replaces it in alignment with the sample channel. Clearance between the rod and housing in the area 30 can now be made the same as the clearance in the area 26. This allows some fluctuation in the fluid flow, so this design is not to be preferred over that of FIG. 1; but there is enough clearance to avoid completely deadheading the channel, and the fluctuation only lasts for the short period of time during which the rod is being moved. After that, passage 29 is aligned with the channel, and the resistance to flow returns to normal. To accommodate the third hole, the second housing section 28, has to be longer than the comparable part in the valve of FIG. 1.

The area between the rod and the housing region is not critical, in the region of the sample channel, but it is important to keep this area to a minimum in the region of the carrier channel. The reason for this is to maintain a true increase in the resistance to fluid flow when the passage through the rod is not aligned with the carrier channel. Both the figures illustrate valves in which the length of the first housing part is long enough so that when the rod is moved, the passage through the rod 24 will always remain within the valve. In this design there is always a path through the rod which the carrier fluid can follow. Reliance is placed on the tortured path that the carrier fluid must follow to pass through passage 24, when it is not in alignment with the carrier channel, to provide the necessary increase in resistance to flow through that passage when that passage is not so aligned. The reason for keeping passage 24 within the valve is to insure that the passage is always flooded with carrier fluid and will therefore remain uncontaminated. From the point of view of the operation of the valve it would be preferable to decrease the length of the first housing so that the area 26 is small. This would mean that when the rod moved, passage 24 would pass through seal 17 to the outside of the valve. Doing so would allow contamination, and would carry some carrier fluid to the outside of the valve with passage 24. In most cases, however, the amount of contamination due to exposure to the air, and the amount of carrier fluid lost would be inconsequential, and the advantage gained by keeping area 26 small would be overriding. The choice depends on the particular circumstances and the present invention contemplates both alternatives.

In all cases the holes passing through the rod are chamfered so that sharp edges will not be available to cut the seals when the holes in the rod pass through them.

Any suitable actuator can be used. It can be mechanical or electrical, direct or indirect, or even manual. The only requirement is that it produces enough force to move the rod. The amount of force required to move the rod depends on the size of the valve. For a ¼-inch rod about 300 pounds of thrust is necessary to move the rod against the pressure of seals tightened enough to prevent leakage. The rod must be moved in a manner such that the passages through it are aligned with the sample and carrier channels. Normally, the two channels are parallel and the rod must be constrained so that it doesn't rotate as it moves. Of course, rotation of the rod by 180° or 360° during movement would be acceptable. If the channels are not parallel some rotation of the rod must be programmed into the movement of the rod to compensate for the angle between the channels.

The valve can be made from any suitable material. Usually a metal is used. To avoid corrosion, stainless steel is a preferred material. This also provides a material on which a good polish for the moving rod can be achieved.

A valve such as that illustrated in FIG. 1 has been operated at up to 6000 p.s.i. carrier fluid pressure for 10,000 cycles without major overhaul of the valve. Under such conditions a small amount of leakage is inevitable because of wear on the seals. The only leakage of concern is leakage between the sample and carrier channels, because it is this leakage that effects the precision of the instrument. This type of leakage can be detected by periodically checking the instrument. The advantage of the design discussed above is apparent under these conditions because the leakage which did occur could be corrected without disassembling the valve, by merely tightening the seals when necessary.

What I claim is:

1. A high-pressure sampling valve comprising:
   a. a housing;
   b. a first channel passing through said housing and having a substantially circular cross section;
   c. a second channel passing through said housing and having a substantially circular cross section of diameter less than the diameter of said first channel, said second channel being adapted to pass fluid and being disposed perpendicular to, and passing through the axis of, said first channel;
   d. a third channel passing through said housing and having a substantially circular cross section of diameter less than the diameter of said first channel, said second channel being adapted to pass fluid and being disposed perpendicular to, and passing through the axis of, said first channel at a position displaced from said second channel by a distance along the axis of said first channel;
   e. a rod, with a diameter less than the diameter of said first channel, having at least two passages running from one side of the rod to the other side of said rod in a direction perpendicular to the axis of said rod and separated from one another by a distance equal to the distance between said second and third channels, said rod being movably disposed within said first channel in a manner such that normally one passage in said rod is aligned with said second channel and another passage in said rod is aligned with said third channel;
   f. first and second seals substantially immovably disposed at each end of said first channel forming leaktight seals between said rod and said housing in a manner such as to allow said rod to move along the axis of said first channel;
   g. a third seal substantially immovably disposed between said second and third channels forming a leaktight seal between said rod and said housing in a manner such as to allow said rod to move along the axis of said first channel; said rod having a diameter such as to provide a clearance between said rod and said housing in the regions contained between said seals, the magnitude of said clearance being small enough so that when the passages in said rod are aligned with said second and third channels the resistance to fluid flow of the path through at least one of the passages is less than the resistance to fluid flow of the path around the rod, and large enough so that, when said rod is moving and no passage in the rod is aligned with either of said second or third channels, fluid will leak around the rod through said second and third channels, but not between them due to the presence of said third seal, whereby uninterrupted flow is allowed through said second and third channels and deadheading said second and third channels is avoided; and
   h. an actuating means adapted to move said rod in a manner such that the passage in said rod normally aligned with said third channel can be aligned with said second channel; whereby an exact volume of the fluid passing through said third channel, corresponding to the volume of the passage through said rod aligned with said third channel, can be transferred to said second channel and injected into the stream of fluid normally flowing through said second channel.

2. The valve of claim 1 wherein: said seals are of the type having two flat metal discs, with holes through their centers of diameters slightly larger than the diameter of said rod, and an elastomeric disc, disposed between said metal discs, with a hole through its center of diameter slightly smaller than the diameter of said rod; said rod passes through the holes in said discs; and said discs are disposed in a manner such that pressure forcing the two metal discs together will force the elastomeric disc to squeeze down on said rod forming a leaktight seal around it.

3. The sampling valve of claim 2 wherein said housing comprises:
   a. a first housing part containing said second channel;
   b. a second housing part containing said third channel, said first and second housing parts being adapted to fit together and to seat said third seal between them;

c. a first end plug adapted to fit the exposed end of said first housing part and to seat said first seal; and d. a second end plug adapted to fit the exposed end of said second housing part and to seat said second seal, said first and second housing parts and said first and second end plugs each containing portions of said first channel and each being aligned with the other housing parts to form a single housing with said first channel passing directly therethrough.

4. The sample valve of claim 1 wherein said passages running from one side of said rod to the other side of said rod are holes passing through said rod.

5. The sampling valve of claim 4 wherein said rod contains three such said holes, two of which are normally aligned with said second and third channels, and the third of which is disposed in a position such that when said rod is moved to align the hole in said rod normally aligned with said third channel with said second channel, the third hole in said rod will be aligned with said third channel.

6. The sample valve of claim 4 wherein said rod contains two such said holes and wherein the clearance between said rod and said housing in the region of said third channel is large enough so that the resistance to fluid flow around the rod is substantially equal to the resistance to fluid flow through the rod, whereby the flow of fluid through the third channel is not substantially decreased by reason of the movement of said rod.